United States Patent Office 3,033,894

Patented May 8, 1962

3,033,894

PREPARATION OF BENZIL BY CATALYZED REACTION OF BENZENE AND CYANOGEN

William L. Fierce, Crystal Lake, and Walter J. Sandner, Carpentersville, Ill., assignors to The Pure Oil Company, Chicago, Ill., a corporation of Ohio No Drawing. Filed Dec. 23, 1957, Ser. No. 704,294
10 Claims. (Cl. 260—465)

This invention relates to new and useful improvements in processes for the preparation of aromatic 1,2-diketones and aryl nitriles. In particular, this invention is based upon the discovery that benzil and benzonitrile may be prepared in good yield by reaction of benzene with cyanogen in a mol ratio greater than 2:1 in the presence of a molar excess of a catalyst consisting essentially of a mixture of an aluminum halide and a hydrogen halide. The reaction with other aromatic hydrocarbons, such as toluene, xylene and naphthalene produces analogous diketones and nitriles.

Benzil and analogous aromatic 1,2-diketones are useful as chemical intermediates in the preparation of a variety of organic compounds. Benzil is normally prepared by the oxidation of benzoin, which is in turn prepared by condensation of two molecules of benzaldehyde in the presence of an aqueous alkali cyanide solution. Aryl nitriles, such as benzonitrile ($C_6H_5CN$) and to tolunitrile ($CH_3C_6H_4CN$), are also useful as chemical intermediates in the preparation of various organic compounds. Benzonitrile and tolunitrile are usually prepared by reaction of a mono-halo toluene or benzene, such as chlorotoluene or bromotoluene, or chlorobenzene or bromo-benzene, with a metal cyanide such as potassium cyanide, cuprous cyanide, or silver cyanide. Tolunitrile and benzonitrile may also be prepared by ammonolysis and dehydration of toluic acid or benzoic acid.

It is one object of this invention to provide a new and improved method for the preparation of aromatic 1,2-diketones and aryl nitriles.

Another object of this invention is to provide an improved method for the preparation of aromatic 1,2-diketones by reaction of cyanogen and an aromatic hydrocarbon.

Another object of this invention is to provide an improved method for the preparation of aryl nitriles by reaction of cyanogen and an aromatic hydrocarbon.

A feature of this invention is the provision of an improved process in which an aromatic hydrocarbon and cyanogen are reacted in the presence of a catalyst consisting essentially of an anhydrous mixture of an aluminum halide and a hydrogen halide to produce an intermediate which is hydrolyzed to produce an aromatic 1,2-diketone.

Another feature of this invention is the provision of an improved process in which benzene, or alkali derivatives thereof, or naphthalene is reacted with cyanogen in at least a 2:1 mol ratio in the presence of a mixture of aluminum chloride and hydrogen chloride, at an aluminum chloride/cyanogen ratio greater than 1, to produce an intermediate product which is hydrolyzed to produce an aromatic 1,2-diketone, such as benzil or an analogue thereof.

A further feature of this invention is the provision of an improved process in which benzene, or an alkyl derivative thereof, or naphthalene and cyanogen are reacted in the presence of a catalyst consisting essentially of an anhydrous mixture of an aluminum halide and a hydrogen halide to produce an aryl nitrile as a principal reaction product in high yield.

Other objects and features of this invention will become apparent from time to time throughout the specification and claims as hereinafter related.

This invention is based upon our discovery that aromatic hydrocarbons, such as benzene, toluene, xylene, and naphthalene will react with cyanogen, in a mol ratio greater than 2:1, in the presence of a catalyst consisting of an anhydrous mixture of an aluminum halide and a hydrogen halide, to produce both an aryl nitrile and an intermediate compound in which the aromatic hydrocarbon has added to both ends of the cyanogen molecule. The intermediate compound, upon hydrolysis, yields an aromatic 1,2-diketone, such as benzil, tolil, naphthil or the like. Derivatives of aromatic hydrocarbons which contain functional groups which are inert toward cyanogen and the catalyst used react in the same way as the aromatic hydrocarbon and are considered to be the equivalent thereof. In carrying out this reaction the cyanogen is added in a mol ratio less than 1:2 relative to the aromatic hydrocarbon, and a mol ratio less than 1:1 relative to the aluminum halide. These proportions of cyanogen relative to the aromatic hydrocarbon and relative to the catalyst represent critical limits for the process. If the reaction is carried out using proportions beyond the indicated limits an entirely different product is obtained. The following specific examples illustrate the carrying out of this invention under different reaction conditions and using different reactants.

*Example I*

A round-bottomed flask equipped with a stirrer and a condenser was charged with 200 ml. of benzene and about 56 g. of anhydrous $AlCl_3$. The mixture was stirred and a gaseous mixture of cyanogen (40 cc./min.) and nitrogen (40 cc./min.) was bubbled in. The exit gas was bubbled through a dilute NaOH solution to capture any unreacted cyanogen. A total of 3.17 g. of cyanogen was added in 35 minutes. The reaction was maintained at ambient or room temperature. No cyanogen was found in the NaOH solution, indicating complete absorption of cyanogen by the benzene-$AlCl_3$ mixture. During the addition of the cyanogen the color of the reaction mixture gradually changed from white to yellow to orange to orange-red to red-brown. Next, a gaseous mixture of anhydrous HCl (60 cc./min.) and nitrogen (40 cc./min.) was bubbled into the reaction mixture. Heating was started and the mixture was refluxed for 30 minutes while the nitrogen-HCl gas mixture was bubbled into it. Then the heating and gas flow were stopped and the reaction mixture was allowed to cool. After standing overnight, the reaction mixture was poured upon a mixture of ice and concentrated HCl. The aqueous layer from this hydrolysis step was extracted with ether, which was then combined with the benzene layer and washed with water until free of acid. The ether and benzene were than evaporated, leaving 7.05 g. of crude product. The presence of benzil in this crude material was verified qualitatively by recrystallizing a portion of it twice from aqueous alcohol. Light yellow crystals were obtained which melted at 91° C. (pure benzil melts at 95° C.). The benzil was further characterized by formation of a 2,4-dinitrophenylhydrazone derivative which had a melting point corresponding to the known benzil-2,4-dinitrophenylhydrazone derivative. The yield of the derivative, 8.55 g., indicated that the yield of purified product was 36.0%, and that the purity of the crude product was 65.7%.

*Example II*

In another experiment benzil was prepared following substantially the same procedure used in Example I. In this experiment 3.34 g. of cyanogen were bubbled into the benzene-$AlCl_3$ mixture. The procedure in this case differed in that the HCl was bubbled into the reaction mixture before (instead of during) the refluxing step. The benzil yield in this case was slightly lower. There was obtained 4.82 g. of crude product which produced 6.88 g. of the 2,4-dinitrophenylhydrazone derivative. The yield of derivative indicated a yield of purified benzil of 27.4% and a purity of 76.9% for the crude product.

*Example III*

In still another experiment the reaction conditions were varied slightly in the preparation of benzil. In this experiment 2.97 g. of cyanogen was bubbled into a mixture of benzene and $AlCl_3$. The procedure in this case differed from the procedure of Example I in that the mixture with aqueous HCl was refluxed for 70 minutes during the hydrolysis step. This change in procedure lowered the yield slightly. In this experiment 5.60 g. of crude product was obtained and converted to the 2,4-dinitrophenylhydrazone derivative. Based on the amount of the derivative obtained, the yield of pure benzil was 29.4%, and the crude product had a purity of 63.1%.

In each of Examples I, II, and III there is also obtained a by-product, benzonitrile, in a yield about the same as the yield of benzil.

*Example IV*

In still another experiment the procedure was varied by eliminating the use of HCl in the reaction. In this experiment benzene and $AlCl_3$ were mixed and 3.05 g. of cyanogen bubbled into the mixture. The cyanogen-containing mixture was then refluxed for 30 minutes and allowed to cool. After cooling, aqueous HCl was added to the mixture and the resulting mixture refluxed for 70 minutes. The aqueous layer from this step was extracted with ether and combined with the benzene layer from the hydrolysis step. The combined ether and benzene solution was water-washed until free of acid, and the solvent was evaporated therefrom, leaving 3.09 g. of crude product. This product did not have the appearance of benzil and did not melt in the range of the melting point of benzil. Furthermore, this product did not form a derivative with 2,4-dinitrophenylhydrazone, which indicated that the product obtained in this experiment was not benzil.

*Example V*

The preparation of tolunitrile and tolil was carried out in a 500 ml., 3-necked flask equipped with a gas-bubbling tube, a mercury-sealed stirrer, and a condenser. To the flask there were charged 54 g. (0.41 mol) of anhydrous aluminum chloride and 200 ml. (1.88 mol) of C.P. toluene. A gaseous mixture of cyanogen (40 cc./min.) and nitrogen (40 cc./min.) was bubbled in, with stirring, for 40 minutes during which time the temperature was slowly raised to 40° C. The cyanogen flow was stopped (after addition of 0.065 mol) and hydrogen chloride (75 cc./min.) was charged with the nitrogen for additional 75 minutes (thus adding 0.23 mol of HCl). The temperature was gradually raised to 80° C. Then nitrogen alone was bubbled in for an additional hour. The reaction mixture was cooled overnight and then poured on a mixture of ice and concentrated hydrochloric acid. The toluene layer was water-washed until neutral, filtered and evaporated to give 10.0 ml. of a dark brown, liquid-solid slurry. The product was analyzed by infrared analysis and contained p-tolunitrile in an amount equal to a yield of about 65%. The remainder of the product is principally p,p-dimethyl benzil, also known as tolil.

*Example VI*

In another experiment the procedure of Example I was followed except that an equal molar amount of xylene was substituted for the benzene. Following this procedure a substantial amount of liquid product was obtained which contains a substantial yield of xylil (tetramethyl benzil) and xylonitrile (dimethyl benzonitrile).

*Example VII*

In still a further experiment cyanogen and hydrogen chloride were bubbled into a suspension of aluminum chloride in a solution of naphthalene in carbon disulfide. The procedure followed was substantially the same as that used in Example I. Following this procedure a substantial yield of liquid product was obtained which contains a substantial yield of dinaphthyl diketone and naphthonitrile.

This process is generally operative for the preparation of aromatic 1,2-diketones and the corresponding aryl nitriles. In this process any aromatic hydrocarbon or its equivalent (derivatives of aromatic hydrocarbons having relatively inert functional substituents) may be reacted with cyanogen in the manner described above. The reaction requires an aromatic hydrocarbon-cyanogen ratio of at least 2:1 and further requires the presence of an anhydrous mixed catalyst consisting of an aluminum halide, such as aluminum chloride or aluminum bromide, and a hydrogen halide such as hydrogen chloride or hydrogen bromide. The aluminum halide catalyst must be present in no less than an equal molar amount relative to the cyanogen reacted. If a lesser proportion of the aromatic hydrocarbon or the aluminum halide catalyst is used a different reaction product is obtained.

While we have described several preferred embodiments of this invention and have described the invention fully and completely as required by the patent laws, we wish it understood that within the scope of the appended claims this invention may be practiced otherwise than as specifically described.

What is claimed is:

1. A method of preparing aromatic 1,2-diketones and aryl nitriles which comprises reacting an aromatic hydrocarbon with cyanogen in a mol ratio not less than about 2:1, in the presence of a catalyst consisting essentially of anhydrous mixture of an aluminum halide of the group consisting of aluminum chloride and aluminum bromide and a hydrogen halide of the group consisting of hydrogen chloride and hydrogen bromide at an aluminum halide-cyanogen molar ratio of at least 1, and hydrolyzing the reaction product to produce a mixture containing an aromatic 1,2-diketone and an aryl nitrile.

2. A method according to claim 1 in which the aromatic hydrocarbon reactant is of the group consisting of benzene, toluene, xylene, and naphthalene.

3. A method according to claim 1 in which the catalyst comprises an anhydrous mixture of aluminum chloride and hydrogen chloride.

4. A method according to claim 1 in which the aromatic hydrocarbon is refluxed during the reaction with cyanogen.

5. A method according to claim 3 in which the aromatic hydrocarbon is benzene and the reaction products comprise a mixture of benzil and benzonitrile.

6. A method according to claim 3 in which the aromatic hydrocarbon is toluene and the reaction products are a mixture of tolil and tolunitrile.

7. A method according to claim 3 in which the aromatic hydrocarbon is xylene and the reaction products obtained are a mixture of xylil and xylonitrile.

8. A method according to claim 3 in which the aromatic hydrocarbon is naphthalene in solution in an inert solvent and the reaction products are a mixture of dinaphthyl 1,2-diketone and naphthyl nitrile.

9. A method according to claim 3 in which cyanogen is added to a large molar excess of benzene and anhydrous aluminum chloride at ambient temperature, anhydrous hydrogen chloride is bubbled into the mixture, the mixture is refluxed, and the product obtained is hydrolyzed with concentrated hydrochloric acid and ice to produce a mixture of benzonitrile and benzil.

10. A method according to claim 6 for preparing tolunitrile and tolil which comprises mixing toluene and anhydrous aluminum chloride at room temperature, bubbling cyanogen into the mixture and increasing the temperature to about 40° C., heating the mixture of reactants to about 80° C. and bubbling anhydrous hydrogen chloride therethrough, and hydrolyzing the resulting reaction products to produce a mixture of tolil and tolunitrile.

References Cited in the file of this patent

UNITED STATES PATENTS 2,789,995 Johnston -------------- Apr. 23, 1957

OTHER REFERENCES

Vorlander: Chemical Abstracts, vol. 5, 1911, page 3817.

Migrdichian: "The Chemistry of Organic Cyanogen Compounds," 1947, p. 247.